Nov. 24, 1964  E. W. ABSOLON  3,158,024
ROTARY LIQUID METER WITH TEMPERATURE RESPONSIVE MEANS
Filed March 12, 1962  3 Sheets-Sheet 1

INVENTOR
ERIC W. ABSOLON
BY
ATTORNEY

Nov. 24, 1964  E. W. ABSOLON  3,158,024
ROTARY LIQUID METER WITH TEMPERATURE RESPONSIVE MEANS
Filed March 12, 1962  3 Sheets-Sheet 2

INVENTOR
ERIC W. ABSOLON
BY
ATTORNEY

INVENTOR
ERIC W. ABSOLON
BY
ATTORNEY

United States Patent Office 3,158,024
Patented Nov. 24, 1964

---

3,158,024
ROTARY LIQUID METER WITH TEMPERATURE RESPONSIVE MEANS
Eric William Absolon, Chessington, England, assignor to Avery-Hardoll Limited, Chessington, England
Filed Mar. 12, 1962, Ser. No. 179,124
Claims priority, application Great Britain, Mar. 20, 1961, 10,104/61
6 Claims. (Cl. 73—233)

This invention relates to liquid meters of the rotary type in which liquid supplied to the meter under pressure produces rotation of an output shaft at a rate proportional to the volume of liquid flowing through the meter, the output shaft operating a counter or other indicating mechanism to show the volume of liquid passing through the meter.

Since liquids expand and contract with changes of temperature, the volume of a given quantity of liquid varies with temperature, and it is desirable, especially in connection with liquid fuels, that a meter through which they are passed shall give a volume indication which is corrected for changes of temperature, so that it indicates the volume at a standard temperature rather than the volume at the actual temperature of the liquid.

The object of the invention is to provide a liquid meter which provides an indication of the volume which liquid passed through it would have at a standard temperature and which may be arranged to compensate for other characteristics of the liquid which vary with temperature and which affect the accuracy of the meter.

According to the invention, in a liquid meter of the type referred to the counter or other indicating mechanism is driven from the meter output shaft through variable ratio gearing, and temperature-sensitive means responsive to changes in the temperature of the liquid passing through the meter are provided to control the ratio of the said gearing.

The continuously variable ratio gearing preferably includes ratio changing means operated by a lever movable about a fulcrum by a thermostatic control device.

Means may be provided to move the position of the fulcrum along the lever to adjust the variation of the gear ratio with temperature in accordance with the coefficients of expansion of different liquids.

The counter or other indicating mechanism may be driven through gearing including a differential gear unit having two input elements one of which is driven through constant ratio gearing from the meter output shaft and the other of which is driven through continuously variable ratio friction gearing from said meter output shaft, the output element of the differential gear unit being connected to the counter or other indicating mechanism.

The invention is hereinafter described with reference to the accompanying drawings, in which.

Figure 1:
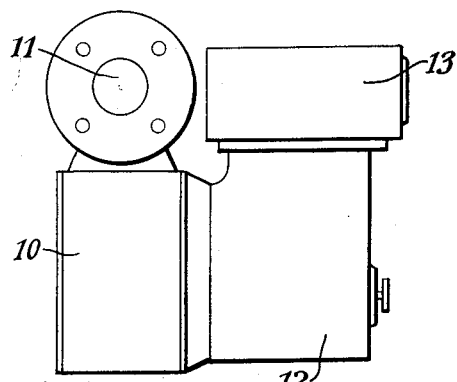
FIGURE 1 is a side elevation of a rotary type liquid meter embodying the invention.

Referring to FIGURE 1, the meter 10 is of any known type having a vaned rotor which is rotated by liquid passing through the meter from an inlet connection 11 to an outlet connection (not shown). The rotor is mounted on a shaft projecting into a gear casing 12 secured to the front of the meter 10, and indicating mechanism, such as a drumtype counter is contained in a casing 13 secured to the top of the gear casing 12.

Figure 4:
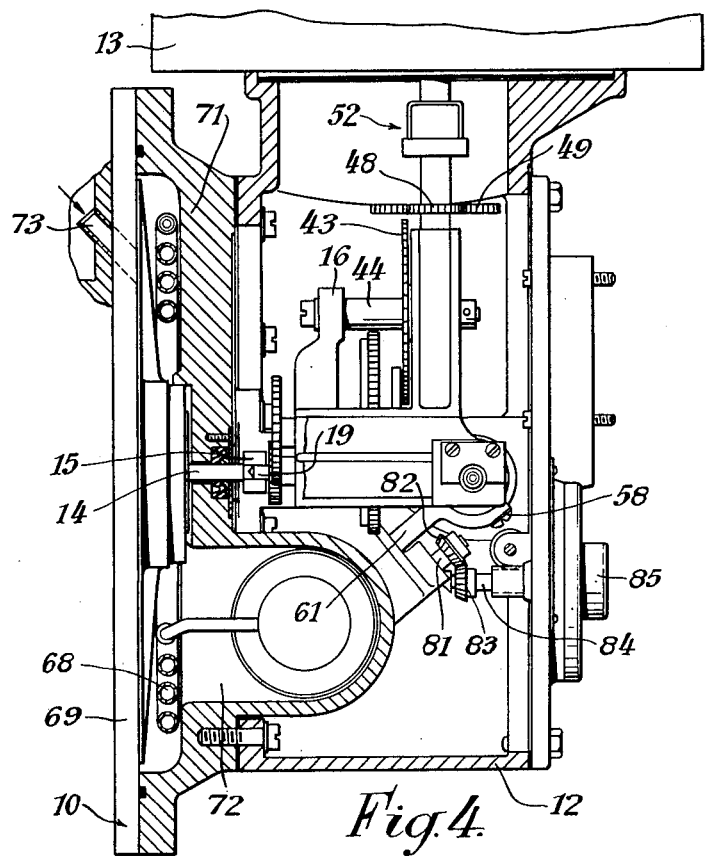
FIGURE 4 is a sectional elevation on the line 4—4 of FIGURE 2 but with some parts in elevation.
Figure 2:
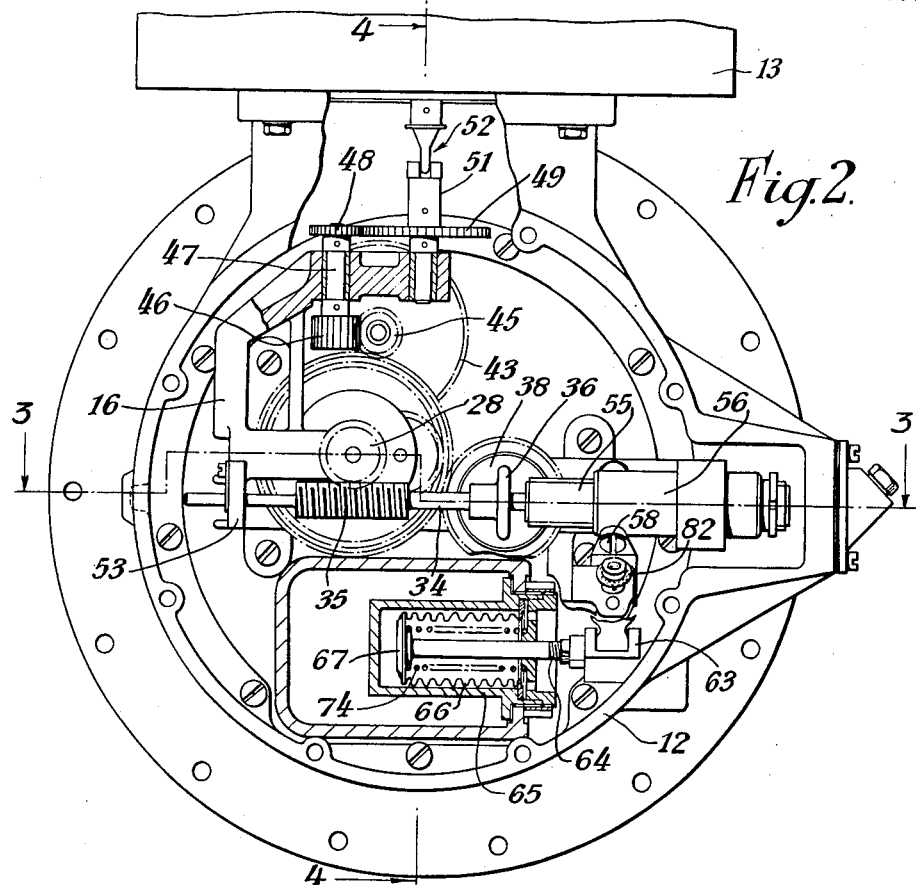
FIGURE 2 is a front elevation, on a larger scale of the gearing interposed between the meter output shaft and the counter, a cover plate covering the gearing being removed and some parts having been omitted to avoid confusion.
Figure 3:
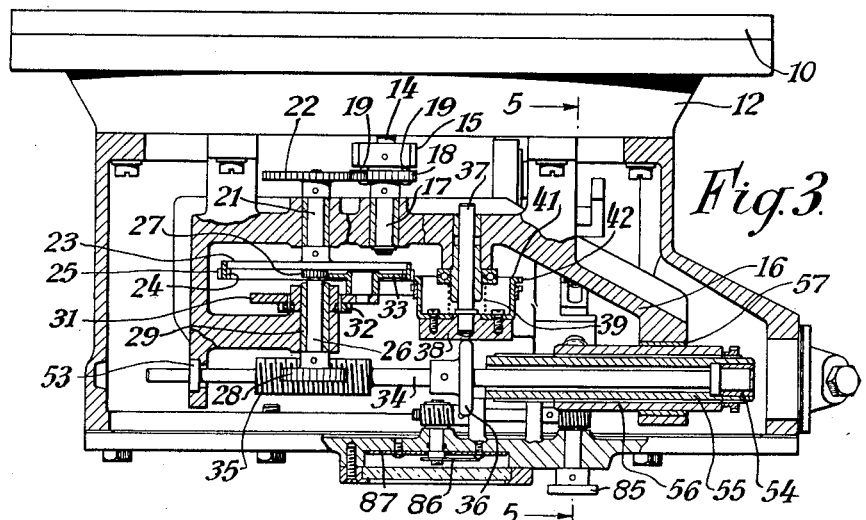
FIGURE 3 is a sectional plan view taken substantially on the line 3—3 of FIGURE 2.

Referring to FIGURES 2, 3 and 4, the meter output shaft 14 (FIGURES 3 and 4) extends into the gear casing 12 and carries a head 15. Inside the gear casing 12 is mounted a frame 16 in which is journalled a spindle 17 carrying a spur gear 18 in which are mounted eccentric pins 19 extending into radial slots in the head 15, so that the said spur gear 18 is rotated by the meter output shaft.

A second spindle 21 also journalled in the frame 16, carries on one end a spur gear 22 meshing with the spur gear 18, and on the other end a gear member 23 having an internal ring of spur teeth 24 and an external ring of spur teeth 25. A third spindle 26 mounted in the frame 16 coaxially with the spindle 21 carries at one end a spur gear 27 lying in the same plane as the internal gear ring 24, and at the other end a worm wheel 28. A sleeve 29 fixed in the frame 16 around the spindle 26 has rotatably mounted on it a disc 31 to which is fixed a spur gear 32, and the disc 31 has rotatably mounted on it a planet spur gear 33 meshing with both the internal gear ring 24 and the spur gear 27.

A shaft 34 mounted for axial movement in the frame 16 in a direction perpendicular to the axes of the spindles 17, 21 and 26 carries a worm 35 meshing with the worm wheel 28, and a friction disc 36. A fourth spindle 37, also mounted in the frame with its axis parallel to those of the spindles 17, 21 and 26 is slidable in the frame and carries a second friction disc 38 urged by a spring 39 against the periphery of the friction disc 36, a cup-shaped member 41 fixed to the disc 38 having spur gear teeth 42 which mesh with the external gear ring 25 on the member 23.

Rotation of the meter shaft 14 is thus transmitted to the spur gear 32 through two paths, one including the spur gears 18, 22, spindle 21, gear ring 24, planet gear 33 and disc 31, and the other including the spur gears 18, 22, spindle 21, gear ring 25, cup-shaped member 41, friction discs 38, 36, shaft 34, worm 35, worm wheel 28, spindle 26, spur gear 27, planet gear 33 and disc 31. The gear ring 24, spur gear 27 and planet gear 33 constitute a differential gear unit of the planetary type.

The friction disc 36 is movable, by sliding movement of the shaft 34, across a diameter of the face of the friction disc 38 so that the said discs constitute a continuously variable change speed gear, changes in the drive ratio of which change the speed of rotation of the spur gear 27 relative to the gear ring 24, thus altering the speed ratio between the meter shaft 14 and the spur gear 32. The spur gear 32 meshes with a further spur gear 43, FIGURES 2 and, 4 fixed to a spindle 44 carrying one of a pair of skew gears 45 and 46, the other of which is fixed to a shaft 47 carrying a spur gear 48 meshing with a spur gear 49 on another spindle 51 carrying one part of a separable drive coupling 52 by which rotation is transmitted to the counter mechanism in the casing 13.

It will thus be seen that, if the shaft 34 is moved longitudinally in response to changes of temperature of the liquid, the reading of the counter mechanism is adjusted in relation to the volume of liquid passing through the meter, and by suitable calibration is made to correspond to the volume which that liquid would have at a predetermined temperature.

Figure 7:
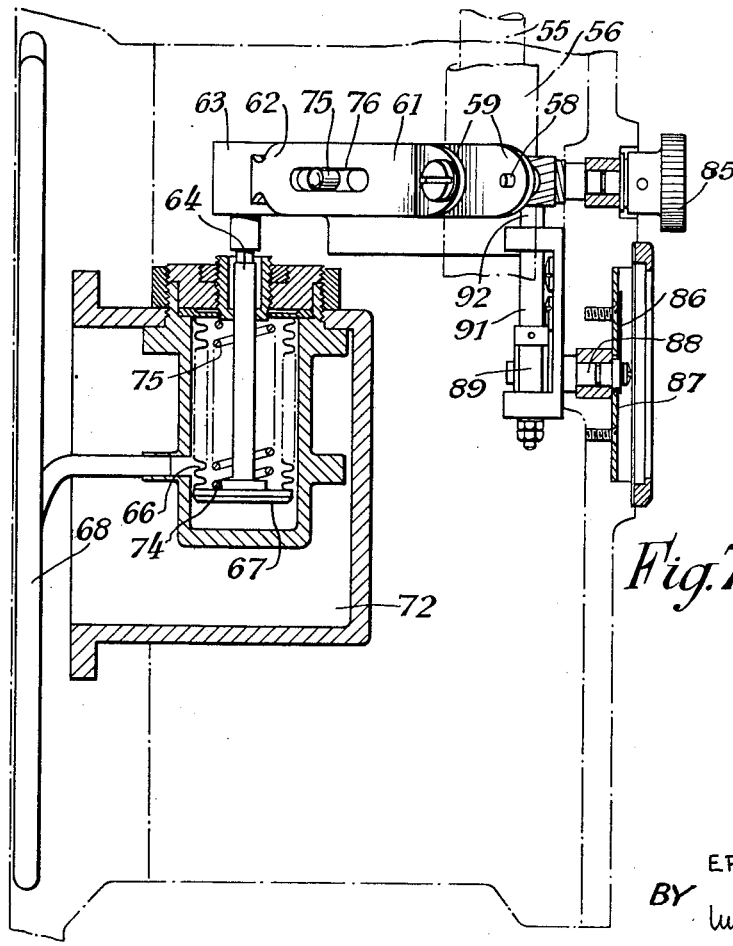
FIGURE 7 is a plan view of the parts shown in FIGURE 5.

The shaft 34 is slidably mounted in a fixed bearing 53 at one end, and at its other end is supported by a combined journal and thrust bearing 54 in a sleeve 55 having screw-threaded engagement with a surrounding sleeve 56 which is slidable in a bearing bush 57 mounted in an opening in the frame 16. The sleeve 56 is formed with two diametrically opposed holes to receive pins 58 mounted in the limbs 59 of a forked end of a lever 61 having a movable fulcrum hereinafter described, the other end of the lever 61 having rounded edges 62 and engaging in a slot in a head 63 mounted on a rod 64 (FIGURES 2 and 7). The rod 64 extends into a cylinder 65 and is surrounded by a flexible bellows 66 one end of which is secured in a fluid-tight manner to the end of the cylinder through which the rod 64 passes, and the other end of which is secured in a fluid-tight manner to flange 67 on the end of the rod. The other end of the cylinder 65 is closed, and the space therein around the bellows is in communication with a closed pipe 68 forming a coil in a shallow cavity between an end wall 69 of the meter and a wall 71 of the casing 12. The cylinder 65 is mounted in a chamber 72 which is in communication with the cavity containing the pipe coil, being supported in an opening in one end of the said chamber. The cavity containing the pipe coil, and the chamber 72, are in communication with the inlet passage of the meter in such a way that liquid is caused to circulate through the said cavity and chamber, for example by providing an inlet 73 (FIGURE 4) so positioned that some of the liquid flowing through the meter inlet is deflected into it, and an outlet which is oppositely directed with respect to the flow in the meter inlet.

The pipe 68 is filled with a liquid having a high coefficient of expansion with temperature change, so that with rise of temperature of the liquid passing through the meter, the liquid in the pipe 68 expands and causes the bellows 66 to contract, rocking the lever 61 to move the shaft 34 longitudinally and vary the ratio of the change speed friction gear. A spring 74 is provided to extend the bellows 66 when the liquid in the pipe 68 contracts.

Figure 6:
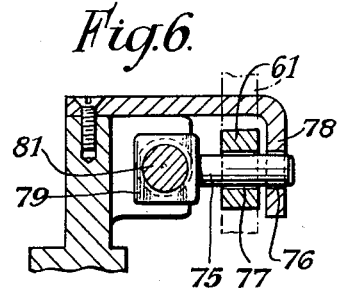
FIGURE 6 is a section on the line 6—6 of FIGURE 5.
Figure 5:
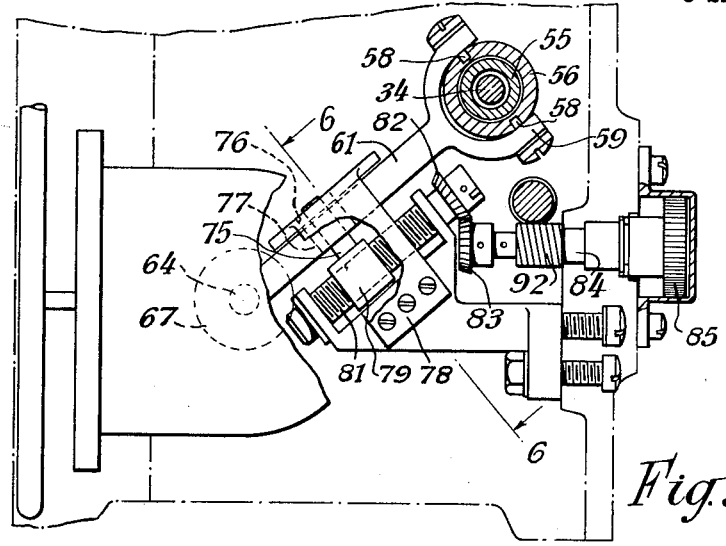
FIGURE 5 is a detail view, partly in section, substantially on the line 5—5 of FIGURE 3.

The fulcrum of the lever 61 is a pin 75 (FIGURES 5, 6 and 7) passing through a longitudinal slot 76 in the lever and through a corresponding slot 77 in a supporting bracket 78 secured to the frame 16, the pin 75 being mounted on a nut 79 engaging a screw-threaded rod 81 lying alongside the lever 61 and journalled in the frame 16, so that, by rotating the rod 81, the pin 75 is moved longitudinally of the lever and the relative length of the arms of the lever is varied. The screw-threaded rod 81 has mounted on one end thereof a bevel gear 82 meshing with a bevel gear 83 on a shaft 84 extending through the wall of the casing 12, the shaft 84 carrying, outside the casing wall, a knob 85 by means of which it can be rotated to move the fulcrum pin. It will be evident that movement of the fulcrum pin 75, by changing the relative lengths of the arms of the lever 61 varies the longitudinal movement of the shaft 34 for a given angular movement of the lever, and enables the change of ratio in the gearing between the meter and the counter mechanism to be set to conform with the temperature coefficient of expansion of the liquid passing through the meter. Rotation of the knob 85, in addition to adjusting the position of the fulcrum pin 75 relative to the lever 61, also moves an indicating pointer 86 over a dial 87 which may be calibrated to show coefficients of expansion with temperature, or with the names of the various liquids with which the meter is to be used. The pointer 86 is mounted on a shaft 88 driven by worm gearing 89 from another shaft 91 which is in turn driven by skew gearing 92 from the shaft 84.

The lever 61, instead of having the pins 58 engaging holes in the sleeve 56, and the rounded surfaces 62 engaging a slot in the head 63, may be slotted longitudinally to receive pins on the sleeve 56 and head 63, so that it is free to float longitudinally.

It is known that the reading given by a meter of the type referred to varies with the viscosity of the liquid being measured so that, with changes of temperature, which affect viscosity, a change in the volume indicated by the meter relative to the actual volume passing through it takes place. The mechanism according to the present invention can, by suitably fixing the relation of the movement of the fulcrum pin 75 to the setting of the knob 85, be made to compensate for this change, so that the accuracy of the meter is not affected by such changes of viscosity.

The change in viscosity of a liquid with temperature is known to be related to its coefficient of expansion, and by suitable shaping of the slot in the lever, the mechanism can be arranged to provide automatically the necessary degree of compensation for viscosity change for any liquid being passed through the meter.

The variable ratio friction gearing provides a relatively simple means for continuously varying the speed ratio between the meter output shaft and the indicating mechanism, but as it is arranged in one of two parallel drive paths and drives the differential gear through a worm and worm wheel combination which is irreversible, the torque transmitted through the friction gearing is small and the risk of slipping is minimized. Moreover, any slipping which does take place has only a very small effect on the indicator reading.

I claim:

1. In a liquid meter of the rotary type including a meter body, a vaned rotor rotatable in said meter body, a meter output shaft driven by said vaned rotor, a gear casing, variable ratio gearing in said gear casing, an indicating mechanism, said variable ratio gearing being operatively connected between said meter output shaft and said indicating mechanism, and ratio-changing means for said gearing, the improvements comprising means defining a cavity within said gear casing, passage means connecting said cavity with said meter body to cause liquid flowing through said meter body also to flow through said cavity, temperature responsive means in said cavity, and a member operated by said temperature responsive means and passing through the wall of said cavity into said gear casing, said member acting on the ratio changing means to change the gear ratio in response to changes of liquid temperature.

2. The improvements in a liquid meter according to claim 1, wherein said member operated by the temperature responsive means is a single lever having a fulcrum.

3. In a liquid meter the improvements according to claim 2, wherein said temperature responsive means comprises a chamber, flexible bellows forming a closure for said chamber, and a pipe coil connected to said chamber and immersed in liquid flowing through said cavity, the bellows being free at one end and connected at that end to one end of said lever, and said chamber and pipe coil being filled with a liquid having a high coefficient of expansion with temperature.

4. In a liquid meter the improvements according to claim 2 wherein said ratio changing means for the gearing comprises a driven friction disc in edge contact with the face of a driving friction disc and movable diametrically of the driving friction disc to vary the drive ratio, the said driven friction disc beng mounted on a shaft moveable axially by said lever, said shaft carrying the driven friction disc being supported at one end by a thrust bearing in an inner sleeve having screw-threaded engagement with an axially slidable outer sleeve, and said lever being operatively connected to the outer sleeve.

5. In a liquid meter the improvements according to claim 2, wherein means are provided to move said position of the fulcrum along the lever to adjust the variation of the gear ratio with temperature in accordance with the coefficients of expansion of different liquids.

6. In a liquid meter the improvements according to claim 5, wherein the lever fulcrum is a pin movable longitudinally of the lever by manually operable screw mechanism.

References Cited in the file of this patent
UNITED STATES PATENTS 2,942,497 Berck ---------------- June 28, 1960

FOREIGN PATENTS 681,222 Great Britain ----------- Oct. 22, 1952